June 5, 1951  O. H. YOUNG  2,556,021
SAFETY CYLINDER FOR FLUID BRAKES
Filed June 20, 1947  2 Sheets-Sheet 1

Inventor
ORVILLE H. YOUNG

By Randolph & Beavers
Attorneys

June 5, 1951 — O. H. YOUNG — 2,556,021
SAFETY CYLINDER FOR FLUID BRAKES
Filed June 20, 1947 — 2 Sheets-Sheet 2
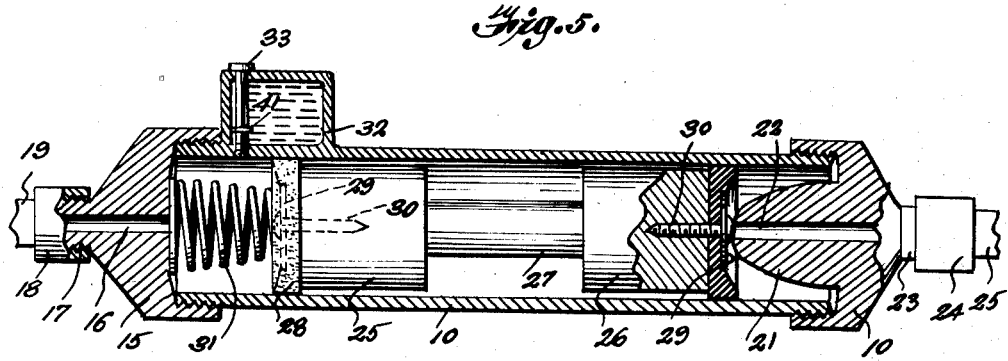
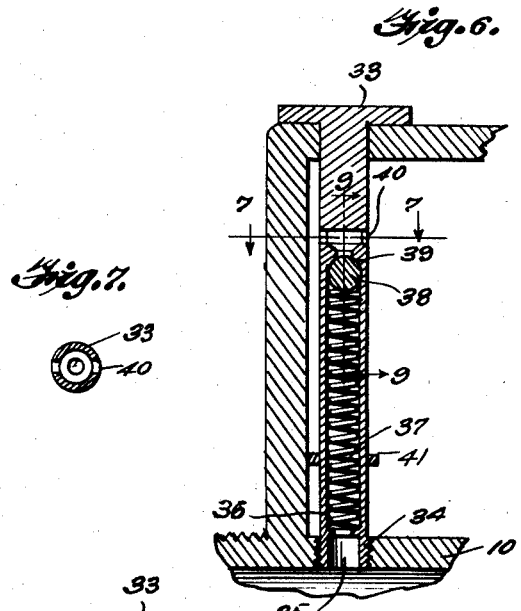
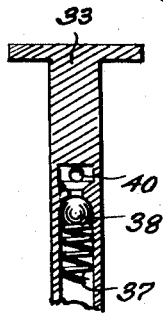
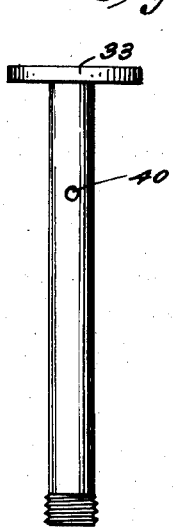
Inventor
ORVILLE H. YOUNG
By Randolph & Beavers
Attorneys Patented June 5, 1951

2,556,021

UNITED STATES PATENT OFFICE 2,556,021

SAFETY CYLINDER FOR FLUID BRAKES

Orville Houston Young, Elkview, W. Va., assignor of one-half to George F. Washington, Charleston, W. Va.

Application June 20, 1947, Serial No. 756,009

1 Claim. (Cl. 60—54.6)

The present invention relates to a safety cylinder for fluid brakes and it consists in the combinations, constructions and arrangements of parts herein described and claimed.

Generally, the invention provides a safety mechanism comprising a cylinder adapted to be placed in the line between the conventional master cylinder and a particular brake cylinder in a fluid braking system. A pair of interconnected pistons is slidably mounted in the cylinder and a spring is interposed between the outer end of one piston and the end of the cylinder adjacent it. Rubber cups are carried on the outer ends of the cylinders and a storage tank is provided at the brake side of the cylinder. Failure of the brake for that particular wheel will cause no loss of pressure in the lines leading from the pump to the other wheels of the vehicle.

It is an object of the invention to provide an efficient safety mechanism whereby the failure of one brake in a hydraulic braking system will not cause a failure of the other brakes in the system.

Another object of the invention is the provision of a novel storage tank in connection with a safety mechanism of the character set forth.

Another object of the invention is the provision of a simple and inexpensive yet efficient safety device for hydraulic braking systems.

Other and further objects of the invention will become apparent from a reading of the following specification taken in conjunction with the drawing, in which:

Figure 5 is a vertical sectional view, partly in elevation, of Figure 1,

Figure 1:
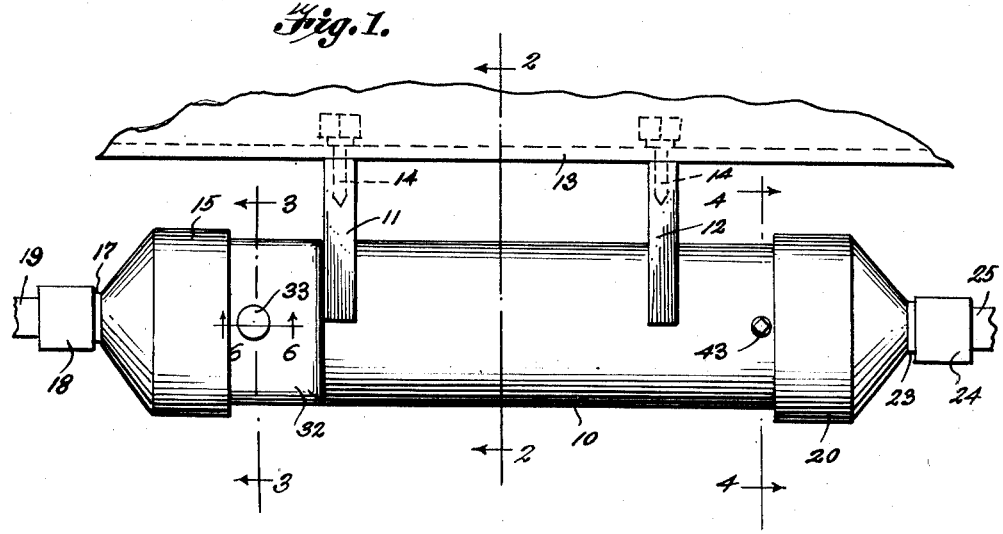
Figure 1 is a top plan view of an embodiment of the invention.
Figure 2:
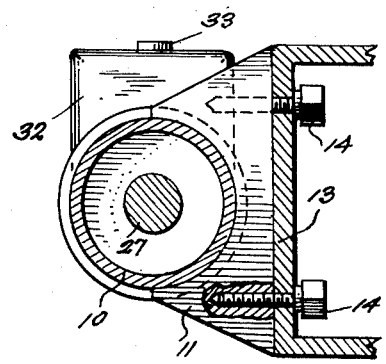
Figure 2 is a sectional view taken along line 2—2 of Figure 1.
Figure 3:
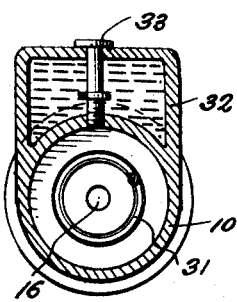
Figure 3 is a sectional view taken along line 3—3 of Figure 1.
Figure 4:
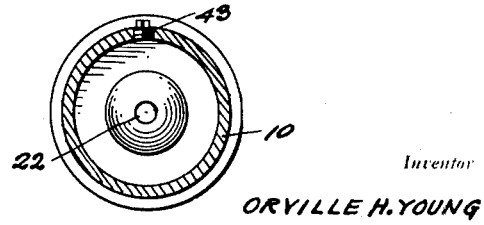
Figure 4 is a sectional view of Figure 1 taken along line 4—4 thereof.

Figure 6 is an enlarged fragmentary sectional view taken along line 6—6 of Figure 1, Figure 7 is a sectional view taken along line 7—7 of Figure 6, Figure 8 is an elevational view of an element of the invention, and Figure 9 is a fragmentary sectional view taken along line 9—9 of Figure 6.

Referring more particularly to the drawing, there is shown therein a safety mechanism for hydraulic braking systems including a cylinder 10 having affixed thereto a pair of brackets 11 and 12 adapted to be fastened to the chassis 13 of a vehicle by means of bolts 14 or the like.

At one end of the cylinder there is threadably mounted a cap 15 having a centrally disposed opening 16 therethrough and having a reduced end portion to which is threadably fastened a coupling 18 for a pipe 19 connected with a brake cylinder.

At the other end of the cylinder 10 there is threadably mounted a cap 20 having an inwardly extending detent 21 and a centrally disposed passage 22 therethrough. A reduced end portion 23 is adapted to threadably receive a coupling 24 which interconnects the same with a pipe 25 leading to a master cylinder (not shown).

A pair of pistons 25 and 26 are interconnected by means of a rod 27 and each is provided on its outer end with a cup 28, preferably formed of rubber and of concave shape on its outer side, and a washer 29 and centrally disposed screw for holding the cup 28 in position upon its respective piston.

A coil spring 31 has its larger end abutting the inner end of the cap 15 and its smaller end abutting the cup 28 of the piston 25.

Formed integrally with the cylinder 10 adjacent the end of the same connected with the brake is a storage tank 32 which has vertically disposed therein an inlet valve 33 which is slidably mounted in the outer face of the tank 33 and threadably mounted at its inner end in the cylinder, as indicated at 34. The valve 33 is provided with a hollow lower end, as shown at 35 in Figure 6, in which is a spring seat 36 for a coil spring 37 which is adapted to hold seated a ball valve 38 against a seat 39. Laterally extending valve openings 40 are provided for communication with the seat 39, valve 38 and hollow passage 35. A guide bracket 41 is provided for the valve 33 adjacent the lower end of the tank 32.

In operation, it will be seen that when the brakes are applied, the master cylinder will apply pressure through the opening 22, thus moving both pistons 25 and 26 against the action of the spring 31, thereby causing a pressure to be imparted on the fluid contained in the line 19 connecting with the brake.

Upon release of the brake applying means, the spring 31 will cause the pistons to return to normal position. Again, upon failure of the brake or loss of fluid therefrom, the pistons will be moved to the left, as viewed in Figure 5, but no loss of fluid nor pressure loss therein will be had in the remaining brakes, there being no direct fluid interconnection therebetween.

In setting up the safety mechanism herein described, air may be let to escape through a bleed plug 43 so that no air may be entrapped in the line from the master cylinder to the safety cylinder. The storage tank may be filled with hydraulic fluid. The wheel brake cylinder (not shown) is then bled and closed and the tank 32 is refilled and the valve 33 placed in position. As fluid is used or leaks from the system for any reason it will flow from the tank 32 into the brake line but when the brakes are applied, the pressure of the piston 25 will cause the valve 38 to close and all pressure to be applied to the line 19 to the brake.

While but one form of the invention has been shown and described herein, it will be readily apparent to those skilled in the art that many minor modifications may be made herein without departing from the spirit of the invention or the scope of the appended claim.

What is claimed is:

A device of the character described comprising a safety cylinder, a connection at one end of said safety cylinder for a master cylinder pressure line, a connection at the other end for a brake cylinder pressure line, a pair of interconnected pistons slidably mounted in said safety cylinder, a spring for normally urging said pistons in a direction toward the connection to the master cylinder pressure line, a storage tank associated with the safety cylinder adjacent the brake cylinder pressure line connection and having an inner opening into the safety cylinder and an outer opening in the side thereof opposite the safety cylinder, a cylindrical valve body extending slidably through the outer opening and threadably mounted in the inner opening and having a hollow inner end and laterally extending passages connected therewith at the outer end of said hollow portion, a valve seat adjacent the lateral passages, a ball valve seated thereon and a compression spring in said hollow portion for normally seating said ball valve.

ORVILLE HOUSTON YOUNG.

REFERENCES CITED

The following references are of record in the file of this patent:

UNITED STATES PATENTS

| Number | Name | Date |
|---|---|---|
| 1,457,156 | Frock | May 29, 1923 |
| 1,952,557 | Masteller | Mar. 27, 1934 |
| 1,986,763 | Rhodes | Jan. 1, 1935 |
| 2,249,227 | Press | July 15, 1941 |